United States Patent Office 3,813,247
Patented May 28, 1974

3,813,247
PHOTOGRAPHIC ELEMENT CONTAINING NON-DIFFUSING POLYMERIC DEVELOPMENT ACCELERATORS
Louis Morton Minsk and Jon Tewksbury Staples, Rochester, N.Y., assignors to Eastman Kodak Company, Rochester, N.Y.
No Drawing. Filed Feb. 29, 1972, Ser. No. 230,471
Int. Cl. G03c 1/04, 1/08, 1/28
U.S. Cl. 96—68                                 10 Claims

ABSTRACT OF THE DISCLOSURE

A polyester is disclosed which comprises the condensation product of:

(A) A bifunctional compound having the formula

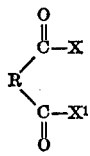

wherein R is an alkylene group, a thia-alkylene group or a dithia-alkylene group and X and $X^1$ are independently selected and are —OH, —$OR^1$ where $R^1$ is an alkyl group, or a halogen, or are taken together and constitute an ether oxygen bridge completing a heterocyclic ring;

(B) A thia-alkylene glycol having an alkylene chain of 5 to 24 atoms including 1 or 2 thioether sulfur atoms or an oxathia-alkylene chain of 2 to 24 atoms which contains at least one oxygen atom and at least two sulfur atoms, each oxygen atom and sulfur atom being bivalently linked to adjoining carbon atoms; and (C) A compound selected from the group consisting of:

(1) glycols of the formula $$HO—R^2—OH$$

wherein $R^2$ is an arylenedialkylene group, an arylene-bis(thia-alkylene) group or an azaalkylene group of 5–11 atoms including at least one nitrogen atom having a

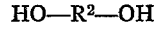

group attached thereto, $R^3$ and $R^4$ being independently selected from the group consisting of hydrogen, lower alkyl of 1–5 carbon atoms, lower alkoxy of 1–5 carbon and halogen; and (2) a second bifunctional compound having the formula:

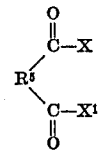

wherein $R^5$ represents the bivalent group:

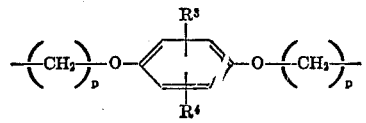

X, $X^1$, $R^3$ and $R^4$ are as described above and p is an integer of from 1 to 6.

BACKGROUND OF THE INVENTION

Field of the invention

This invention relates to photographic silver halide emulsions. In one of its aspects this invention relates to an improved means for sensitizing photographic silver halide emulsions. In another of its aspects this invention relates to novel non-diffusing compounds useful in sensitizing multilayer color photographic silver halide systems.

Description of the prior art

It is well known that the sensitivity of photographic emulsions is increased by the addition of sulfur compounds called chemical sensitizers. The process of chemical sensitization, however, reaches a definite limit beyond which further addition of sensitizer, or further digestion with the sensitizer present, merely increases the fog of the photographic emulsion while the speed remains constant or decreases.

A number of polymers containing thioether and/or ether linkages have been described as development accelerators in multi-layer photographic silver halide emulsions, e.g., British Patent Specifications 548,019 and 600,058, and U.S. Pats. 3,046,129; 3,046,132 and 3,046,-133. However, all of these compounds suffer from an inherent tendency to diffuse in considerable amounts from the layer in which they were originally placed to adjacent layers. This behavior materially reduces the amount of development accelerator in the original treated layer and at the same time affects the photographic properties of the multilayer element as a whole. Diffusion of the accelerator not only apparently lowers the speed of the original treated layer, but also causes undesirable speed and gamma increases in the neighboring layers. This contamination process is a matter of special concern in multilayer color photographic elements since a color photograph in which the colors are in proper balance can be obtained only by making adjustments in each layer of the multilayer element to compensate for the appearance or disappearance of development accelerator.

Thus, there is a need in the photographic art for development accelerators which will exhibit minimal diffusion from their prescribed layer in a multilayer photographic silver halide system.

SUMMARY OF THE INVENTION

It is an object of this invention to provide a novel class of polymers useful as development accelerators in photographic silver halide emulsions.

Another object is to provide novel polymeric development accelerators which show a reduced tendency to diffuse or wander when incorporated in multilayer photographic silver halide systems, especially those systems that are useful in color photography.

A further object is to provide novel polyester compositions comprising thioether linkages and hydrophobic substituents comprising aromatic groups in or pendant to the polymer chain.

A still further object is to provide a new class of photographic sensitizers of reduced diffusibility which can supply additional sensitivity to photographic silver halide emulsions already sensitized with certain chemical sensitizers, such as sulfur sensitizers.

Other objects and advantages of the present invention will become apparent from a reading of the specification and claims.

The present invention comprises a class of polymeric materials which act as development accelerators when incorporated in photographic silver halide emulsions, said polymeric materials comprising linear polyesters having sulfur atoms in the form of thioether linkages in the main chain, or backbone, of the polymer and aryl units in either the main chain or in any side chains or pendant groups attached thereto.

More particularly, the present invention comprises a polyester comprising the condensation product of:

(A) A bifunctional compound having the formula

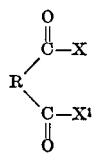

wherein R is an alkylene group, a thia-alkylene group or a dithia-alkylene group and X and $X^1$ are independently selected and are —OH, —$OR^1$ where $R^1$ is an alkyl group, or a halogen, or are taken together and constitute an ether oxygen bridge completing a heterocyclic ring;

(B) A thia-alkylene glycol having an alkylene chain of 5 to 24 atoms including 1 or 2 thioether sulfur atoms or an oxathia-alkylene chain of 2 to 24 atoms which contains at least one oxygen atom and at least two sulfur atoms, each oxygen atom and sulfur atom being bivalently linked to adjoining carbon atoms; and (C) A compound selected from the group consisting of:

(1) glycols of the formula $$HO—R^2—OH$$

wherein $R^2$ is arylenedialkylene group, an arylenebisthia-alkylene) group or an azaalkylene group of 5–11 atoms including at least one nitrogen atom having a

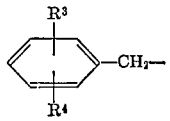

group attached thereto, $R^3$ and $R^4$ being independently selected from the group consisting of hydrogen, lower alkyl of 1–5 carbon atoms, lower alkoxy of 1–5 carbon atoms and halogen; and (2) a second bifunctional compound having the formula:

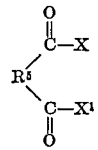

wherein $R^5$ represents the bivalent group:

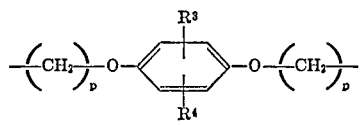

$X^1$, $X^1$, $R^3$ and $R^4$ are described above and $p$ is an integer of from 1 to 6.

DESCRIPTION OF THE PREFERRED EMBODIMENTS

In accordance with this invention, a novel class of polymeric materials has been found which act as development accelerators when incorporated in photographic silver halide emulsions. These materials are particularly useful in multilayer color photographic elements since they diffuse to a considerably lesser extent from the layer in which they are originally incorporated than polymeric development accelerators known heretofore.

The polymeric materials of this invention provide a means of further increasing the sensitivity of photographic emulsions, which may be applied even though the ordinary processes of chemical sensitization have been carried to the effective limit of the photographic emulsion in question. This process is to be distinguished from hypersensitization, which acts primarily on optically sensitized photographic emulsions and tends to increase the free silver ion concentration of the emulsion and greatly diminish its stability.

The novel compounds of this invention are termed development accelerators. These compounds do not appear to be chemical sensitizers in the usual sense, since they increase speed by their presence during exposure and processing and require no digestion with the photographic emulsion to produce the increase in speed. Furthermore, this process is to be distinguished from processes which exert an accelerating effect only during processing of the exposed silver halide emulsion. Such processes employ compounds such as potassium nitrate, chrome alum and certain amines, which are structurally different from the compounds of this invention.

The novel sulfur containing linear polyesters of this invention can be regarded as condensation polymers obtained by reacting a dicarboxylic acid or a functional equivalent thereof with a glycol, one or both of these reactants containing at least one thioether linkage, and a second glycol or a second dicarboxylic acid or functional equivalent thereof, one or both of the second glycol or second dicarboxylic acid containing at least one aromatic group an optionally one or more thioether sulfur atoms. Most advantageously the total number of effective moles of carboxylic substituent in the reactants equals the total number of moles of hydroxyl substituent. Optimally, no more than two thioether sulfur atoms or aromatic groups are contained in any one reactant. Those skilled in the art will realize, however, that limited deviations from these provisions will also result in useful compounds that lie within the scope of this invention.

As employed herein, the term thioether linkage means a linkage wherein a divalent sulfur atom is joined to two noncarbonyl carbon atoms. The aromatic units useful in this invention are generally cyclic aromatic hydrocarbon groups which are bivalent when they occur in the polymer backbone and monovalent when they are part of pendant groups attached to the backbone. These aromatic units act to reduce appreciably diffusion or wandering of the compounds of the invention when they are incorporated in a specific layer of a multilayer photographic silver halide system such as, for example, a multilayer color photographic element.

As stated above, functional equivalents of the dicarboxylic acid units can be employed to advantage in preparing the polyesters of this invention. For example, instead of employing the free acid in the condensations, the corresponding acid anhydrides may be utilized. Similarly, other functional equivalents such as phenyl esters of dicarboxylic acids or dicarboxylic acid halides, chlorides or bromides, for example, are effective.

A useful class of the sulfur-containing polyester compounds of this invention is obtained by reacting a dicarboxylic acid or functional equivalent thereof, with two or more glycols. It is to be understood that the provisions stated immediately above apply here also, and that at least one of the glycols contains one or more thioether sulfur atoms and at least one of the other glycols contains an aromatic nucleus. This invention also embraces sulfur-containing polyester compounds obtained from two or more different dicarboxylic acids and one glycol unit, the total number of moles of carboxyl substituent being equal to the total number of moles of hydroxyl groups and the aromatic nucleus being contained in one of the diacids. Any of the reactants may contain the thioether linkage but it is desirable to have this linkage in one of the glycols.

The dicarboxylic acid units and glycol units can be employed to advantage in various proportions to obtain the polymeric compounds of the invention. For example, in the combination of a dicarboxylic acid, a glycol A and a glycol B which carries the aromatic group, especially useful molar ratios of acid to glycol A to glycol B range from about 5:4:1 to 2:1:1, preferably in the range of 4:3:1 to 3:2:1. For those polyester compounds of this invention obtained by the polymerization of one glycol with two dicarboxylic acids, C and D, where D is the diacid moiety that contains the aromatic grouping, particularly effective ratios of glycol to acid C to acid D include 5:4:1 and 4:3:1.

One or more thioether sulfur atoms are necessarily contained in at least one of the reactants used in preparing the compounds of this invention. Good results are secured when one or both glycol units contain one or more sulfur atoms, when sulfur is present solely in the acid reactant, or when sulfur occurs in both acid and glycol units. In addition to sulfur, the polymers of this invention can contain other hetero atoms in the main chain of the linear polymer such as, for example, oxygen and nitrogen.

Aromatic groups useful in the practice of this invention include cyclic groups derived from naphthalene, substituted naphthalene, and mono- and divalent groups derived from benzene such as, for example, phenylene and benzyl, which can be substituted with a variety of groups including lower alkyl of from 1 to 5 carbon atoms, halogen such as chlorine or bromine and the like. When the aromatic group is a pendant benzyl group, the point of attachment can only be a nitrogen atom in the main chain of the polymer. This invention does not embrace sulfur bearing linear polyesters which contain pendant monocyclic groups attached to a carbon atom in the backbone of the polymer.

In accordance with a preferred embodiment of this invention, novel linear polyester compounds are provided which are the condensation products of (1) Bifunctional compound having the formula

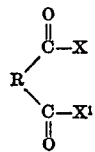

I.

wherein R is an alkylene group of from 2 to 10 carbon atoms, preferably 2 to 3 carbon atoms, each of X and $X^1$ are —OH, —$OR^1$ where $R^1$ is an alkyl group of 1 to 18 carbon atoms, or halogen such as chloride or bromide, and X and $X^1$ taken together constitute an ether oxygen bridge (—O—) needed to complete a heterocyclic ring;

(2) A thia-alkylene glycol having an alkylene chain of 5 to 24 atoms including 1 to 2 thioether sulfur atoms or an oxathia-alkylene chain of 2 to 24 atoms which contains at least one oxygen atom and at least two sulfur atoms, each oxygen and sulfur being bivalently linked to adjoining carbon atoms, and (3) A glycol having the formula

HO—$R^2$—OH   II.

wherein $R^2$ is an arylenedialkylene group such as

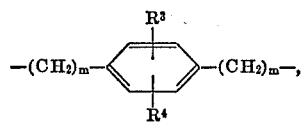

an arylene bis(thia-alkylene) group such as

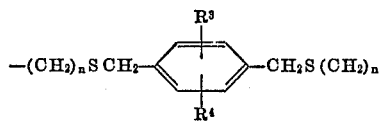

or an aza-alkylene group of from 5 to 11 atoms including at least one nitrogen atom having a

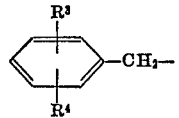

group attached thereto, each of $R^3$ and $R^4$ are hydrogen, lower alkyl of 1 to 5 carbon atoms, lower alkoxy of 1 to 5 carbon atoms, lower alkoxy of 1 to 5 carbon atoms and halogen such as chloro or bromo, each of $R^3$ and $R^4$ preferably being hydrogen, $m$ is an integer of from 2 to 5 and $n$ is an integer of from 1 to 6. The bifunctional compound (1) and the glycols (2) and (3) are preferably reacted together in molar ratios in the range of 3:2:1 to 4:3:1.

In another preferred embodiment novel linear polyester compounds are provided which are prepared by the condensation polymerization of (1) A bifunctional compound having the formula

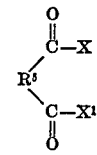

III.

wherein $R^5$ is a thia-alkylene group of from 3 to 9 atoms including one thioether sulfur atom or a dithia-alkylene group of 6 or more atoms, including two sulfur atoms, each sulfur atom being linked bivalently to adjoining carbon atoms, and X and $X^1$ have the values described above, (2) A thia-alkylene glycol having an alkylene chain of from 5 to 24 atoms including 1 or 2 thioether sulfur atoms, and (3) A glycol of formula II above. The bifunctional compound (1) and the glycols (2) and (3) are preferably reacted together in molar ratios in the range of 3:2:1 to 4:3:1.

In another preferred embodiment of this invention, novel linear polyesters are provided which are the condensation products of (1) A bifunctional compound having formula I above,
(2) A thia-alkylene glycol having an alkylene chain of 5 to 24 atoms including 1 to 2 thioether sulfur atoms, and
(3) A glycol having the formula

HO—$R^6$—OH   IV.

wherein $R^6$ is represented by the bivalent group

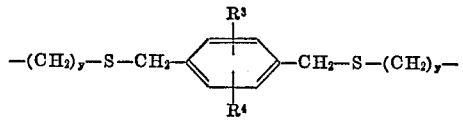

where $R^3$ and $R^4$ have the values recited above and $y$ is an integer of from 2 to 6. Excellent results are achieved when the bifunctional compound (1) and the glycols (2) and (3) are reacted together in molar ratios in the range of 3:2:1 to 4:3:1.

In another embodiment, novel linear polyesters are provided which are the condensation products of (1) A bifunctional compound of formula I above,
(2) A second bifunctional compound having the formula

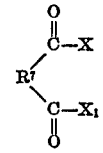

wherein $R^7$ represents the bivalent group

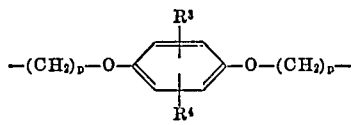

and (3) A thia-alkylene glycol of formula II above. The bifunctional compounds (1) and (2) and the glycol (3) are preferably reacted together in molar ratios of 4:3:1 to 5:4:1 and X, $X^1$, $R^3$ and $R^4$ are as shown above and $p$ is an integer of from 1 to 6.

The development accelerator compounds of this invention desirably contain from about 25 to about 300 or more mole percent, i.e. ¼ to 3 moles of sulfur per repeating unit, preferably from about 40 to about 80 mole percent, of sulfur. As previously stated, the aromatic substituents employed in the practice of this invention are preferably derivatives of benzene. These groups usefully constitute from about 10 to about 25 mole percent, preferably from about 10 to 17 mole percent, of the polymers of this invention.

In a highly useful class of polyeters of this invention, prepared from a dicarboxylic acid or a functional equivalent thereof and two structurally different glycols, the aryl substituent, which can be either in the main chain, or backbone or off the chain in an attached pendant group, is contained in only one of the glycols. Polymers of this type are synthesized from a combination of two glycols in which the aryl group-containing glycol advantageously constitutes from about 10 to 50 percent by weight of the combination.

In another useful class of polyesters of this invention prepared from a glycol containing one or more sulfur atoms and two structurally different dicarboxylic acids or functional equivalents thereof, the aryl substituent, which can be either in or pendant to the polymer chain, is contained in only one of the dicarboxylic components. The aryl group-containing dicarboxylic component in any member of this class of polymer desirably constitutes from 20 to 60 percent by weight of the combined weight of the two dicarboxylic components, preferably 30 to 50 percent by weight.

The molecular weight of the linear polyesters of this invention can vary over a broad range, but it has been found that polymeric materials having a molecular weight of about 500 to 10,000 are particularly useful, and polyester compounds having a molecular weight of about 1000 to 3500 most preferred.

The dibasic acids or their functional equivalents and the glycols useful in preparing the polymeric compounds of this invention can be prepared by methods well known in the art.

Exemplary sulfur bearing alkylene glycols which are useful in preparing the development accelerator compounds of this invention include 3,11-dithia-7-oxatridecane-1,13-diol
3-thiapentane-1,5-diol
3,6-dithiaoctane-1,8-diol
4,10-dithiatridecane-1,13-diol
4,15-dithiaoctadecane-1,18-diol
7,13-dithianonadecane-1,19-diol
7,13-dithiatetracosane-1,24-diol
4,8-dithiaundecane-2,11-diol
3-thiahexane-1,6-diol
4-thiaheptane-1,7-diol
3-thianonane-1,9-diol.

Useful alkylene glycols containing aromatic groups typically include 1,4-benzenedimethanol
1,4-benzenedipropanol
2,5-toluenedimethanol
2,5-ethylbenzenedimethanol
2,5-phenetoledipropanol
2,5-bis(3-hydroxypropyl)butoxybenzene
2,5-(dihydroxymethyl)chlorobenzene
2,2'-(benzylimino)diethanol
2,2'-(4-methoxybenzylimino)diethanol
3,3'-(4-propylbenzylimino)dipropanol
2,2'-(2-bromobenzylimino)diethanol
4,4'-(3,5-dimethylbenzylimino)dibutanol.

Illustrative examples of dicarboxylic acids and anhydrides employed to advantage in this invention include

| | |
|---|---|
| succinic | suberic |
| glutaric | 4-thiapimelic |
| adipic | 3,6-dithiasuberic |
| azelaic | 3,7-dithiaazelaic |
| sebacic | 3,8-dithiasebacic |
| pimelic | 3-thiaadipic |

Esters and halides of the foregoing can also be used to advantage. A particularly preferred ester is diethyl (p-phenylenedioxy)diacetate.

The polymeric development accelerator compounds of this invention can be prepared according to methods known in the art. Among such methods are those comprising the condensation of a dicarboxylic compound with a glycol to form a linear polyester polymer. For convenience, the polymerization reactions leading to the compounds of this invention are generally carried out in the melt phase either by direct elimination of water or by transesterification. Other useful techniques include interfacial and solution polymerization. The condensations are advantageously conducted in the presence of one or more catalytic agents. Useful catalysts for the transesterification reactions include the carbonates, oxides, hydroxides, hydrides and alkoxides of alkali metals or alkaline earth metals, compounds of Group IV–A metals of the Periodic Table, e.g., titanium isopropoxide, organometallic halides and complex alkoxides such as $NaHTi(OC_4H_9)_2$ and the like. Those reactions in which water is eliminated are facilitated by agents such as sulfonic acids e.g., p-toluenesulfonic acid, except when one of the reactants is a tertiary amine such as 2,2'-benzylamino)diethanol; phosphoric acid; antimony pentafluoride; dialkyltin oxides and the like.

The preparation of the emulsions employed in the practice of this invention involves three separate operations: (1) the emulsification and digestion of silver halide, (2) the freeing of the emulsion of excess water-soluble salts, usually by washing with water, and (3) the second digestion or "after-ripening" to obtain increased emulsion speed or sensitivity (Mees, "The Theory of the Photographic Process," 1954). The development accelerators of this invention can be added to the emulsion before the final digestion or after-ripening, or they can be added immediately prior to coating the emulsion onto a suitable support.

The particular quantity of polyester used in a given emulsion can vary, depending upon the effects desired, degree of ripening, silver content of the emulsion, etc. The amount used is also dependent upon the particular stage at which the sensitizer is added during the preparation of the emulsion. Generally, from about 25 mg. to about 3 g. of polyester per mole silver halide are adequate to accomplish the desired sensitization. Especially good results are obtained with about 0.5 g. to about 1 g. of polyester per mole of silver halide.

The polymeric compounds of this invention can be used in photographic emulsions which are acidic in character or in emulsions which are alkaline.

It is apparent that the subject compounds will exist in a salt form depending upon the pH of the emulsion to which they are added. It may therefore be desirable to adjust the pH before the addition of the compound of the invention.

Silver halide emulsions containing the polymeric development accelerators of the invention can be sensitized using any of the well-known techniques in emulsion making, for example, by digesting with naturally active gelatin or various sulfur, selenium, tellurium compounds and/or gold compounds. The emulsions can also be sensitized with salts of noble metals of Group VIII of the Periodic Table which have an atomic weight greater than 100.

The instant polymeric development accelerators can be used for color photography, for example, in silver halide emulsions containing color-forming couplers or emulsions to be developed by solutions containing couplers or other color-generating materials, emulsions of the mixed-packet type, such as described in Godowsky U.S. Pat. 2,698,794, issued Jan. 4, 1955; in silver dye-bleach systems; and emulsions of the mixed-grain type, such as described in Carroll and Hanson U.S. Pat. 2,592,243, issued Apr. 8, 1952.

The subject polymeric development accelerators can be used to advntage in photographic materials which do not contain color-forming agents such as, for example, the multilayer photographic element described in Staud U.S. Pat. 2,376,202, issued May 15, 1945.

When photographic emulsions containing the polymeric development accelerators of the invention are intended for use in color photography in systems wherein a dye (e.g., dye-bleach process) or the color-forming components are incorporated in the emulsions themselves, it is to be understood that these bleachable dyes or color-forming components can be incorporated in the emulsions according to any of the methods well known to those skilled in the art of photography. Since it is desired that the color-forming components or couplers not wander from the layers in which they are incorporated, couplers which do have wandering tendencies can be employed in a useful manner according to the technique described in Jelley and Vittum U.S. Pat. 2,322,027, issued June 15, 1943. This method comprises adding the color coupler to a water-immiscible crystalloidal solvent, such as tricresyl phosphate or dibutyl phthalate and adding the solution to an aqueous emulsion. Where the couplers are characterized by inherent non-wandering characteristics due to the presence in the coupler molecules of a fatty type radical [e.g., 1-(2,4,6-trichlorophenyl)-3-n-pentadecyl-5-pyrazolone; 1-phenyl-3-n-pentadecyl-4-(1 - phenyl-5-tetrazolylthio)-5-pyrazolone; 1-phenyl-3-(3,5-disulfobenzamido) - 4 - (2-hydroxy-4-n-pentadecylphenylazo)-5-pyrazolone dipotassium salt, etc.], the coupler can be incorporated in the emulsion simply by dissolving it in a convenient organic solvent which does not have any deleterious effect upon the emulsion. Of course, the nature of the solvent will vary depending upon the solubility characteristics of the particular coupler. In general, solvents, such as pyridine, triethanolamine, ethyl alcohol, etc., can be employed for this purpose. The method described in Fierke et al., U.S. Pat. 2,801,171 can also be used.

When used in photographic emulsions such as silver halide emulsions intended for color photography, such emulsions can be optically sensitized with cyanine and merocyanine dyes, such as those described in Brooker U.S. Pats. 1,846,301, issued Feb. 23, 1932; 1,846,302, issued Feb. 23, 1932 and 1,942,854 issued Jan. 9, 1934; White U.S. Pat. 1,990,507, issued Feb. 12, 1935; Brooker and White U.S. Pats. 2,112,140, issued Mar. 22, 1938; 2,165,338, issued July 11, 1939; 2,493,747, issued Jan. 10, 1950 and 2,739,964, issued Mar. 27, 1956; Brooker and Keyes U.S. Pat. 2,493,748, issued Jan. 10, 1950, Sprague U.S. Pats. 2,503,776, issued Apr. 11, 1950 and 2,519,001, issued Aug. 15, 1950; Heseltine and Brooker U.S. Pat. 2,666,761, issued Jan. 19, 1954; Heseltine U.S. Pat. 2,734,900, issued Feb. 14, 1956; Van Lare U.S. Pat. 2,739,149, issued Mar. 20, 1956; and Kodak Limited British Pat. 450,958, accepted July 15, 1936.

The present development accelerators can also be used in diffusion transfer processes which, for example, utilize undeveloped silver halide in non-image areas of the negative to form a positive by dissolving the undeveloped silver halide and precipitating it on a receiving layer in close proximity to the original silver halide emulsion layer. Such processes are described in Rott U.S. Pat. 2,352,014, issued June 20, 1944 and Land U.S. Pats. 2,584,029, issued Jan. 29, 1952; 2,698,236, issued Dec. 28, 1954; 2,543,181, issued Feb. 27, 1951 and 2,698,245, issued Dec. 28, 1954; and Yackel et al., U.S. Pat. 3,020,155 issued Feb. 6, 1962.

The present development accelerators can also be used in color transfer processes which utilize the diffusion transfer from a light-sensitive layer to a second layer, while the two layers are in close proximity to one another. Color processes of this type are described in Land U.S. Pats. 2,559,643, issued July 10, 1951 and 2,698,798, issued Jan. 4, 1955; Land and Rogers Belgian Pats. 554,933 and 554,934, granted Aug. 12, 1957; International Polaroid Belgian Pats. 554,212, granted July 16, 1957 and 554,935, granted Aug. 12, 1957; Yutzy U.S. Pat. 2,756,142, granted July 24, 1956 and Whitmore and Madar Canadian Pat. 602,607, issued Aug. 30, 1960.

The present development accelerators can be used in the preparation of photographic products wherein a photographic developing agent is incorporated in a light-sensitive emulsion, or in a hydrophilic colloid layer contiguous with the emulsion, for example, in photographic products of the type described in Yutzy et al. U.S. Pat. 2,725,298, issued Nov. 29, 1955 or in Yutzy et al. U.S. Pat. 2,739,890, issued Mar. 27, 1956. Suitable developing agents include polyhydroxy benzenes, aminophenols and 3-pyrazolidones.

The novel photographic systems of the invention can also be used in monobath processes such as are described in Haist et al. U.S. Pat. 2,875,048, issued Feb. 24, 1959 and in web-type processes, such as the one described in Tregillus et al. U.S. Patent Application Ser. No. 835,473, filed Aug. 24, 1959, now U.S. Pat. 3,179,517.

Also the photographic emulsions containing the development accelerators of the invention can be used in the preparation of lithographic printing plates using, for example, techniques as described in Kodak French Pat. 1,280,832, issued Nov. 27, 1961.

It has been found that the photographic emulsions containing the development accelerators of the present invention can contain certain stabilizers or antifoggants that are particularly useful for reducing incubation fog. Useful stabilizing compounds for the emulsions of my invention include the salts of noble metals, especially palladium and platinum, including such salts as are described in Trivelli and Smith U.S. Pats. 2,566,245, issued Aug. 28, 1951 and 2,566,263, issued Aug. 28, 1951. Another group of useful stabilizing compounds include urazole stabilizers, such as urazole, 1-phenyl dithiourazole, 1-ethyl dithioriourazole, etc., including stabilizers disclosed in Howe U.S. Pat. 2,538,599, issued Dec. 19, 1950. Other useful stabilizers include mercury compounds such as those disclosed in Allen et al. U.S. Pat. 2,728,663, issued Dec. 27, 1955; Carroll et al. U.S. Pat. 2,728,664, issued Dec. 27, 1955 and Leubner et al. U.S. Pat. 2,728,665, issued Dec. 27, 1955. It has also found that the photographic systems of the invention can be further stabilized with disulfide compounds, including the cyclic disulfides of Kodak Belgian Pat. 569,317 or the aliphatic disulfides of Herz and Kalenda U.S. Pat. 3,043,696, issued July 10, 1962. 1-phenyl-5-mercaptotetrazoles are useful stabilizers in the invention. Watersoluble salts of Group II elements of the Periodic Table such as magnesium, calcium, strontium, barium, cadmium and zinc, organic tertiary phosphines and azaindenes such as triazaindenes, tetrazaindenes and pentazaindenes are also useful stabilizers in the photographic systems of the invention. Typical suitable azaindenes are disclosed in Heimbach and Kelly U.S. Pats. 2,444,605 and 2,444,606, issued July 6, 1948; Heimbach U.S. Pats. 2,444,607, issued July 6, 1948 and 2,450,397, issued Sept. 28, 1948; Heimbach and Clark U.S. Pat. 2,444,609, issued July 6, 1948; Allen and Reynolds U.S. Pat. 2,713,541, issued July 19, 1955 and 2,743,181, issued Apr. 24, 1956; Carroll and Beach U.S. Pat. 2,716,062, issued Aug. 23, 1955; Allen and Beilfuss U.S. Pat. 2,735,769, issued Feb. 21, 1956; Reynolds and Sagal U.S. Pat. 2,756,147, issued July 24, 1956; Allen and Sagura U.S. Pat. 2,772,164, issued Nov. 27, 1956 and Z. Weiss. Phot., vol. 47, 1952, pp. 2–28.

The following examples are included for a further understanding of the invention:

EXAMPLE 1

Copoly[thiodiethylene, p-xylylene bis(thioethylene) succinate]

A mixture of succinic anhydride (10.00 g., 0.10 mole), 2,2'-thiodiethanol (9.15 g., 0.075 mole) and α,α'-bis(2-hydroxy-ethylthio)-p-xylene (6.45 g., 0.075 mole) is heated under nitrogen until a clear, homogeneous melt is obtained. Nitrogen is then bubbled through the melt to entrain water while the temperature is raised to 150–155° C. and maintained at that level for 16 hours. The reaction vessel is then subjected to aspirator pressure for 4 hours and high vacuum for 3 hours. The residue is dissolved in acetone, treated with decolorizing carbon and precipitated into methanol. The yellow grease thus obtained is dried in vacuo giving 11.9 g. of product with a molecular weight (M.W.) of 2000 (end group titration).

Analysis.—Calcd.: C, 50.5; H, 5.9; S, 16.8. Found: C, 50.2; H, 5.7; S, 16.7.

EXAMPLE 2

Copoly[thiodiethylene, p-xylene bis(thioethylene) glutarate]

A mixture of glutaric anhydride (13.68 g., 0.12 mole), 2,2'-thiodiethanol (10.98 g., 0.09 mole) and α,α'-bis(2-hydroxy-ethylthio-p-xylene, 774 g., 0.03 mole) is slowly heated under a blanket of nitrogen until a homogeneous melt is obtained. Nitrogen is then bubbled through the melt to entrain water while the temperature is raised to 150–155° C. and maintained at that level for 16 hours. The reaction vessel is then subjected to high vacuum for 4 hours while the temperature is raised to 170° C. The residue is dissolved in acetone, treated with decolorizing carbon and precipitated into methanol. The resulting grease is dried thoroughly in vacuo to give 11.1 g. of product M.W.=1,800 (end group titration).

Analysis.—Calcd.: C, 52.4; H, 6.3; S, 15.9. Found: C, 52.5; H, 6.4; S, 16.0.

EXAMPLE 3

Copoly(thiodiethylene, 1,4-benzenedimethylene succinate)

A mixture of succinic anhydride (16.00 g., 0.16 mole), 2,2'-thiodiethanol (14.64 g., 0.12 mole) and 1,4-benzenedimethanol (5.52 g., 0.04 mole) and a trace of p-toluenesulfonic acid is melt polymerized under a stream of nitrogen at 170° C. for 4 hours. The system is then subjected to high vacuum for 4.5 hours at 170° C. The residue is treated in the manner of Example 2. The M.W. obtained is 1900 (end group titration).

Analysis.—Calcd.: C, 52.0; H, 5.8; S, 11.5. Found: C, 51.6; H, 6.0; S, 11.2.

EXAMPLE 4

Copoly(3,11-diethia-7-oxatridecylene,1,4-benzenedimethylene succinate)

A mixture of succinic anhydride (8.00 g., 0.08 mole), 3,11-dithia-7-oxatridecan-1,13-diol (15.24 g., 0.06 mole) and 1,4-benzenedimethanol (2.76 g., 0.02 mole) is polymerized in the melt under a stream of nitrogen at 155° C. for sixteen hours. The system is then subjected to high vacuum for five hours while the temperature is allowed to rise to 175° C.

The residue is dissolved in hot acetone, decolorized with activated charcoal and precipitated into a large volume of methanol. The yield of dried product is 13.5 g., M.W. =3500.

Analysis.—Calcd.: C, 52.7; H, 6.8; S, 15.6. Found: C, 52.5; H, 7.0; S, 15.5.

EXAMPLE 5

Copoly(thiodiethylene, 1,4-benzenedimethylene 3,3'-thiodipropionate)

A mixture of 3,3'-thiodipropionic acid (21.36 g., 0.12 mole), 2,2'-thiodiethanol (9.76 g., 0.08 mole) and 1,4-benzenedimethanol (5.52 g., 0.04 mole) and a trace amount of p-toluenesulfonic acid is melt polymerized under a stream of nitrogen at 170° C. for 16 hours. The system is then subjected to high vacuum for 4.5 hours at 160–170° C. The residue is treated as in Example 2. A yield of 14.8 g. is obtained, M.W.=1450 (end group titration).

Analysis.—Calcd.: C, 55.2; H, 7.1; S, 13.7. Found: C, 54.9; H, 6.8; S, 14.0

EXAMPLE 6

Copoly[thiodiethylene, 2,2'-(benzylimino)diethylene succinate]

A mixture of succinic anhydride (20.00 g., 0.20 mole), 2,2'-thiodiethanol (19.52 g., 0.16 mole) and 2,2'-(benzylimino)-diethanol (7.80 g., 0.04 mole) is melt-polymerized under a stream of nitrogen at 150–155° C. for sixteen hours and then subjected to high vacuum at the same temperature for four hours. The resulting dark grease is dissolved in hot acetone, treated with decolorizing carbon twice and then precipitated into methanol. The dried product is a dark brown heavy oil weighing 20.6 g., M.W.=2200 (end group titration).

Analysis.—Calcd.: C, 51.5; H, 6.1; N, 1.3; S, 11.7. Found: C, 51.1; H, 6.2; N, 1.4; S, 11.9.

EXAMPLE 7

Copoly[3,6-dithiaoctylene, p-xylylene bis(thioethylene) succinate]

A mixture of succinic anhydride (12.00 g., 0.12 mole), 3,6-dithiaoctan-1,8-diol (16.38 g., 0.09 mole) and α,α'-bis-(2-hydroxyethylthio)-p-xylene (7.74 g., 0.03 mole) is melt-polymerized under a stream of nitrogen at 160° C. for sixteen hours and then subjected to high vacuum at the same temperature for five hours. The residue is dissolved in a minimal amount of hot acetone, decolorized and placed in the freezer. A waxy, white solid precipitates after several hours in the cold. The yield is 21.8 g., M.W.=3200 (end group titration).

Analysis.—Calcd.: C, 48.7; H, 6.0; S, 22.6. Found: C, 48.6; H, 5.7; S, 22.8

EXAMPLE 8

Copoly[3,6-dithiaoctylene, 2,2'-(benzylimino)diethylene succinate]

This compound is prepared in the manner of Example 7 except that the aromatic group-containing reactant is 2,2'-(benzylimino)diethanol. The M.W. obtained is 2800 (end group titration).

Analysis.—Calcd.: C, 50.5; H, 6.26; N, 1.31; S, 17.9. Found: C, 49.9; H, 6.00; N, 1.10; S, 18.3.

EXAMPLE 9

Copoly[3,11-dithia-7-oxatridecylene, 2,2'-(benzylimino)diethylene succinate]

A mixture of succinic anhydride (8.00 g., 0.08 mole), 3,11 - dithia 7 - oxatridecan - 1,13-diol (15.24 g., 0.06 mole) and 2,2'-(benzylimino)diethanol (3.90 g., 0.02 mole) is reacted in the manner of Example 4. A yield of 1.69 g. is obtained. The M.W. is 3700 (end group titration).

Analysis.—Calcd.: C, 53.2; H, 7.1; N, 1.1; S, 14.9. Found: C, 52.8; H, 6.8; N, 1.2; S, 14.6.

EXAMPLE 10

Copoly[thiodiethylene, 2,2'-(benzylimino)diethylene succinate]

This polymer is prepared according to the procedure of Example 3 except that 2,2'-(benzylimino)diethanol (3.90 g., 0.02 mole) is substituted for the 1,4-benzenedimethanol employed therein. An M.W. of 3700 is obtained (end group titration).

Analysis.—Calcd.: C, 53.2; H, 7.1; N, 1.1; S, 14.9. Found: C, 52.8; H, 6.8; N, 1.2; S, 14.6.

EXAMPLE 11

Copoly[thiodiethylene succinate, (p-phenylenedioxy)-diacetate]

A mixture of 2,2'-thiodiethanol (14.64 g., 0.12 mole), diethyl succinate (15.66 g., 0.09 mole) and diethyl (p-phenylenedioxy)diacetate (8.46 g., 0.03 mole) is melt-polymerized under a stream of nitrogen at 165° C. for two hours and then at 175° C. for two and one-half hours. The residue is dissolved in acetone, decolorized and preciptated into methanol. M.W.=2500 (vapor pressure osometry).

Analysis.—Calcd.: C, 49.4; H, 5.6; S, 13.9. Found: C, 48.4; H, 5.3; S, 12.3.

Examples 12 and 13 illustrate the advantageous increases in speed that are obtained when the polymeric development accelerator compounds of this invention are incorporated in black and white and color negative photographic silver halide emulsions. The molar ratios of the reactants used in the preparation of the exemplary polymers are varied over a wide range, subject to the provision that the total number of effective moles of carboxylic substituent equals the total moles of hydroxyl substituent.

EXAMPLE 12

Samples of the compounds listed in Table I below are added to separate portions of a high-speed silver bromoiodide emulsion which has been panchromatically sensitized with a cyanine dye. Each emulsion sample is coated on a cellulose acetate film support at a coverage of 459 mg. of silver and 1040 mg. of gelatin per square foot. A sample of each film coating is exposed on an Eastman 1B sensitometer, processed for 5 minutes in Kodak DK-50 Developer, fixed, washed and dried. The results are shown in Table I. The control samples do not contain the compounds of the invention.

TABLE I

| Polymer | Molar ratios of reactants* | | | | Conc., g./Ag mole | Rel. speed | Gamma | Fog |
|---|---|---|---|---|---|---|---|---|
| | A | B | C | D | | | | |
| Control | | | | | | 100 | 1.55 | .18 |
| Copoly[p-xylylenebis(thioethylene) succinate] | 1 | | | 1 | 3.0 | 138 | 1.45 | .16 |
| Control | | | | | | 100 | 1.30 | .18 |
| Copoly[thiodiethylene, p-xylylenebis-(thioethylene) succinate] | 2 | | 1 | 1 | 0.9 | 155 | 1.10 | .24 |
| | 3 | | 2 | 1 | 0.3 | 170 | 1.67 | .28 |
| | 4 | | 3 | 1 | 3.0 | 295 | 1.20 | .38 |
| | 5 | | 4 | 1 | 3.0 | 191 | 1.05 | .30 |
| Control | | | | | | 100 | 1.55 | .18 |
| Copoly[p-xylylenebis(thioethylene) glutarate] | 1 | | | 1 | 3.0 | 132 | 1.52 | .14 |
| Control | | | | | | 100 | 1.49 | .17 |
| Copoly[thiodiethylene, p-xylylenebis(thioethylene) glutarate] | 2 | 1 | | 1 | 3.0 | 166 | 1.42 | .20 |
| | 3 | 2 | | 1 | 0.9 | 148 | 1.45 | .19 |
| | 4 | 3 | | 1 | 3.0 | 191 | 1.23 | .22 |

*The structures of reactants A, B, C and D in Tables I-IV inclusive are as follows:

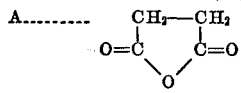

A — 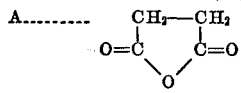

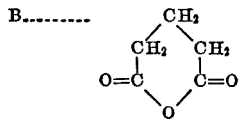

B — 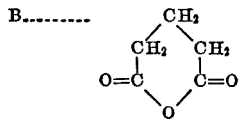

C — HOCH₂CH₂SCH₂CH₂OH

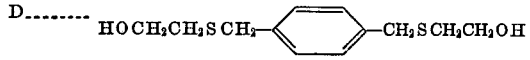

D — HOCH₂CH₂SCH₂—⟨ ⟩—CH₂SCH₂CH₂OH

EXAMPLE 13

Samples of the compounds employed in Example 11 are added to separate portions of a red sensitive sulfur and gold sensitized gelatin silver bomoiodide emulsion containing a dispersion of a cyan-forming phenolic coupler of the type described in U.S. Pat. 2,474,293. The emulsion samples and a control are coated on cellulose acetated film support at 100 mg. Ag and 272 mg. gelatin/ft.². A sample of each film coating is exposed on an Eastman 1B sensitometer, and processed at 22° C. according to the following procedure:

| | Time |
|---|---|
| Color develop | 12 min. |
| Wash | 15 sec. |
| Fix | 4 min. |
| Wash | 4 min. |
| Bleach | 8 min. |
| Wash | 4 min. |
| Fix | 4 min. |
| Wash | 7 min. |
| Buffer | 1 min. |
| Wash | 2 sec. |
| Total time | 44 min. 17 sec. |

The results are given in Table II.

TABLE II

| Polymer | Molar ratios of reactants* A | B | C | D | Conc., g./Ag mole | Rel. speed | Gamma | Fog |
|---|---|---|---|---|---|---|---|---|
| Control | | | | | | 100 | 1.36 | .07 |
| Copoly[p-xylylenebis(thioethylene) succinate] | 1 | | | 1 | 1.0 | 120 | 1.48 | .06 |
| Control | | | | | | 100 | 1.33 | .11 |
| Copoly[thiodiethylene, p-xylylenebis-(thioethylene) succinate] | 2 | 1 | | 1 | 1.0 | 120 | 1.60 | .15 |
| | 3 | 2 | | 1 | 2.0 | 132 | 1.72 | .19 |
| | 4 | 3 | | 1 | 3.0 | 151 | 1.92 | .25 |
| | 5 | 4 | | 1 | 2.0 | 145 | 2.12 | .26 |
| Control | | | | | | 100 | 1.36 | .07 |
| Copoly[p-xylylenebis(thioethylene) glutarate] | 1 | | | 1 | 1.0 | 120 | 1.47 | .06 |
| Control | | | | | | 100 | .86 | .32 |
| Copoly[thiodiethylene, p-xylylenebis-(thioethylene) glutarate] | 2 | 1 | | 1 | 2.0 | 118 | 1.12 | .40 |
| | 3 | 2 | | 1 | 2.0 | 141 | 1.22 | .47 |
| | 4 | 3 | | 1 | 2.0 | 132 | 1.15 | .43 |

As indicated previously, the novel aromatic group-containing thioether polymers of this invention show a reduced tendency to diffuse or wander from their prescribed layer when incorporated in a multilayer color photographic element. This is highly surprising since thioether polymeric development accelerator compounds known hitherto do not exhibit this advantageous characteristic. In the following examples, the behavior in multilayer color photographic elements of the subject development accelerator compounds and prior art development accelerators is compared.

EXAMPLE 14

Samples of polymers prepared from reactants A, C and D described in Table I above, in a wide range of molar ratios, and the prior art compound poly(thiodiethylene succinate) are added to separate portions of the red sensitive color negative emulsion described in Example 13 above. Each emulsion sample and a control are coated with appropriate antifoggants as above, except at a coverage of 150 mg. Ag and 200 mg. of gelatin/ft.². Over this emulsion layer is coated a gelatin interlayer at 82 mg. gelatin/ft.², and over that a green sensitive sulfur and gold sensitized gelatino silver bomoiodide emulsion containing a dispersion of a pyrazolone magenta coupler of the type described in U.S. Pat. 2,600,788 and appropriate antifoggants at a coverage of 150 mg. Ag and 200 mg. of gelatin/ft.².

Poly(thiodiethylene succinate) is prepared according to the following procedure:

In an all-glass outfit equipped with an air-reflux condenser and gas inlet for admitting dry nitrogen below the level of the melt are placed 18.35 g. of 3-thiapentane-1,5-diol and 14.85 g. of succinic anhydride. The reaction flask is immersed in a thermostatically controlled oil bath whose temperature is raised to 150° C. where it is maintained. After the temperature has been at 150° C. for one hour, a slow stream of dry nitrogen is passed through the melt. After 16 hours at 150° C., a water pump vacuum is applied to remove gross water with the reaction vessel still at 150° C. A high vacuum pump, giving a vacuum in the reaction vessel of less than 0.1 mm. is then applied for 3 hours, after which the bath temperature is raised to 170° C. and the pumping continued for an additional 4¾ hours. The melt is then cooled under vacuum. The solidified melt is dissolved by refluxing in 150 g. of acetone. The solution is filtered through paper to remove suspended material and then chilled in a bath of solid carbon dioxide in acetone. The desired product precipitates from solution. This is filtered onto a cold Büchner funnel, washed on the funnel with cold acetone, and dried in a vacuum desiccator under a constantly applied water pump vacuum.

Samples of each coating are exposed on an Eastman 1B sensitometer through a red filter (Kodak Wratten Filter No. 29) and through a green filter (Kodak Wratten Filter No. 99). The exposed coatings are processed in the following manner:

|  | Min. |
|---|---|
| Color develop | 12 |
| Stop bath | 2 |
| First fix | 2 |
| Wash | 2 |
| Bleach | 4 |
| Wash | 2 |
| Hardener fix | 2 |
| Wash | 8 |
| Formalin hardener | 3 |
| Wash | 3 |
| Buffer | 3 |
| Total time | 43 |

The speed determined from the red exposure indicates the amount of direct development acceleration by each compound. The speed determined by the green exposure provides a convenient measure of the degree of diffusion of the respective development accelerators from the red sensitive layer in which they are originally incorporated to the green sensitive layer. The amount of acceleration that would occur if all of the accelerators were to diffuse to the green sensitive emulsion layer from the original red sensitive emulsion layer is indicated in the column designated "G." These speed values result from an exposure through a Wratten No. 99 Filter of similar coatings to which 0.5 g. of accelerator is added to the green sensitive emulsion layer. The relative speeds are shown in Table III.

TABLE III

| Polymer | Molar ratios of reactants | | | | Conc., g./Ag mole | Relative speed | | |
|---|---|---|---|---|---|---|---|---|
| | A | B | C | D | | Red | Green | G |
| Control | | | | | | 100 | 100 | 100 |
| Poly(thiodiethylene succinate) | 1 | | 1 | | 0.5 | 309 | 240 | |
| Copoly[thiodiethylene, p-xylenebis-(thioethylene) succinate] | 5 | | 4 | 1 | 0.5 | 282 | 135 | |
| | 5 | | 4 | 1 | 0.5 | | | 324 |
| | 4 | | 3 | 1 | 0.5 | 302 | 110 | |
| | 4 | | 3 | 1 | 0.5 | | | 289 |
| | 3 | | 2 | 1 | 0.5 | 289 | 115 | |
| | 3 | | 2 | 1 | 0.5 | | | 251 |
| | 2 | | 1 | 1 | 0.5 | 240 | 97 | |
| | 2 | | 1 | 1 | 1.0 | 276 | 120 | |
| | 2 | | 1 | 1 | 0.5 | | | 209 |
| Copoly[p-xylylenebis(thioethylene) succinate] | 1 | | | 1 | 0.5 | 151 | 95 | |
| | 1 | | | 1 | 1.0 | 186 | 100 | |
| | 1 | | | 1 | 0.5 | | | 126 |

EXAMPLE 15

The procedure of Example 14 is repeated with samples of polymers prepared from reactants B, C and D, in a wide range of molar ratios, and the prior art compound poly(thiodiethylene glutarate). The sensitometric data are presented in Table IV.

Poly(thiodiethylene glutarate) is prepared in the manner of Example 14 except that 6.1 g. of 3-thiapentane-1,5-diol is used and 5.6 g. of glutaric anhydride is substituted for the succinic anhydride.

TABLE IV

| Polymer | Molar ratios of reactants | | | | Conc., g./Ag Mole | Relative speed | | |
|---|---|---|---|---|---|---|---|---|
| | A | B | C | D | | Red | Green | G |
| Control | | | | | | 100 | 100 | 100 |
| Poly(thiodiethylene glutarate) | | 1 | 1 | | 0.5 | 316 | 159 | |
| | | 1 | 1 | | 1.0 | 339 | 276 | |
| | | 1 | 1 | | 0.5 | | | 363 |
| Copoly[thiodiethylene, p-xylylenebis-(thioethylene) glutarate] | | 4 | 3 | 1 | 0.5 | 251 | 95 | |
| | | 4 | 3 | 1 | 1.0 | 263 | 126 | |
| | | 4 | 3 | 1 | 0.5 | | | 229 |
| | | 3 | 2 | 1 | 0.5 | 251 | 126 | |
| | | 3 | 2 | 1 | 1.0 | 302 | 182 | |
| | | 3 | 2 | 1 | 0.5 | | | 257 |
| | | 2 | 1 | 1 | 0.5 | 209 | 95 | |
| | | 2 | 1 | 1 | 1.0 | 229 | 110 | |
| | | 2 | 1 | 1 | 0.5 | | | 162 |
| Copoly[p-xylylenebis(thioethylene) glutarate] | | 1 | | 1 | 0.5 | 145 | 95 | |
| | | 1 | | 1 | 1.0 | 141 | 105 | |
| | | 1 | | 1 | 0.5 | | | 115 |

EXAMPLE 16

Samples of a number of structurally different polymeric compounds of this invention represented by Examples 3 to 6 and 8 to 11 are tested in accordance with the procedure of Example 12. The resulting sensitometric data are shown in Table V.

TABLE V

| Example number | Conc., g./Ag mole | Relative speed | Gamma | Fog |
|---|---|---|---|---|
| 3 | 3 | 159 | 1.27 | 0.20 |
| Control | | 100 | 1.51 | 0.15 |
| 4 | 3 | 191 | 1.17 | 0.26 |
| Control | | 100 | 1.27 | 0.16 |
| 5 | 3 | 159 | 1.60 | 0.22 |
| Control | | 100 | 1.67 | 0.18 |
| 6 | 0.9 | 234 | 1.28 | 0.24 |
| Control | | 100 | 1.51 | 0.18 |
| 8 | 3 | 148 | 1.30 | 0.41 |
| Control | | 100 | 1.41 | 0.30 |
| 9 | 3 | 214 | 1.17 | 0.42 |
| Control | | 100 | 1.41 | 0.30 |
| 10 | 3 | 195 | 1.00 | 0.26 |
| Control | | 100 | 1.23 | 0.15 |
| 11 | 3 | 151 | 1.42 | 0.21 |
| Control | | 100 | 1.50 | 0.15 |

EXAMPLE 17

The non-diffusing properties of the development accelerator compounds of Examples 3 to 6 and 8 to 11 are shown to advantage by incorporating them in a multilayer color photographic element according to the procedure of Example 14. This procedure is also used to prepare reference coatings in which the incorporated development accelerator is the prior art compound poly(thiodiethyl glutarate). The preparation of poly(thiodiethylene glutarate) is described in Example 15. The photographic results are set out in Table VI.

TABLE VI

| Example number | Ratios of reactants | Conc., g./Ag mole | Relative speeds | | | |
|---|---|---|---|---|---|---|
| | | | Red sensitive layer | | Green sensitive layer | |
| | | | Compound of invention | Reference compound* | Compound of invention | Reference compound* |
| 3 | 4:3:1 | 0.5 | 302 | 302 | 135 | 214 |
| 4 | 4:3:1 | 0.5 | 251 | 251 | 118 | 191 |
| 5 | 3:2:1 | 0.5 | 347 | 302 | 174 | 214 |
| 6 | 5:4:1 | 0.5 | 380 | 380 | 138 | 159 |
| 8 | 4:3:1 | 0.5 | 295 | 289 | 155 | 166 |
| 9 | 4:3:1 | 0.5 | 302 | 302 | 132 | 214 |
| 10 | 3:2:1 | 0.5 | 302 | 302 | 132 | 214 |
| 11 | 4:3:1 | 0.5 | 380 | 363 | 141 | 214 |

*The reference compound is poly(thiodiethylene glutarate).

This invention has been described in detail with particular reference to certain preferred embodiments thereof, but it will be understood that variations and modifications can be effected within the spirit and scope of the invention.

What is claimed is:

1. A photographic element comprising a support having coated thereon at least one photographic silver halide emulsion containing a polymeric development accelerator comprising a polyester comprising the condensation product of:

(A) a bifunctional compound having the formula $$R\begin{matrix}C-X \\ \| \\ O\end{matrix}\bigg/\begin{matrix}\\ \\ \end{matrix}\bigg\backslash\begin{matrix}C-X^1 \\ \| \\ O\end{matrix}$$

wherein R is an alkylene group, a thia-alkylene group or a dithia-alkylene group and X and $X^1$ are independently selected and are —OH, —$OR^1$ where $R^1$ is an alkyl group, or a halogen, or are taken together and constitute an ether oxygen bridge completing a heterocyclic ring;

(B) a thia-alkylene glycol having an alkylene chain of 5 to 24 atoms including 1 or 2 thioether sulfur atoms or an oxothia-alkylene chain of 2 to 24 atoms which contains at least one oxygen atom and at least two sulfur atoms, each oxygen atom and sulfur atom being bivalently linked to adjoining carbon atoms; and (C) a compound selected from the group consisting of:

(1) glycols of the formula $$HO-R^2-OH$$

wherein $R^2$ is an arylenedialkylene group, an arylene bis(thia-alkylene) group or an aza-alkylene group of 5–11 atoms including at least one nitrogen atom having a $$\begin{matrix}R^3 \\ | \\ \langle\!\!\!\bigcirc\!\!\!\rangle-CH_2- \\ | \\ R^4\end{matrix}$$

group attached thereto, $R^3$ and $R^4$ being independently selected from the group consisting of hydrogen, lower alkyl of 1–5 carbon atoms, lower alkoxy of 1–5 carbon atoms and halogen; and (2) a second bifunctional compound having the formula:

$$R^5\begin{matrix}C-X \\ \| \\ O\end{matrix}\bigg/\begin{matrix}\\ \\ \end{matrix}\bigg\backslash\begin{matrix}C-X^1 \\ \| \\ O\end{matrix}$$

wherein $R^5$ represents the bivalent group:

$$-(CH_2)_p-O-\begin{matrix}R^3 \\ | \\ \langle\!\!\!\bigcirc\!\!\!\rangle \\ | \\ R^4\end{matrix}-O-(CH_2)_p-$$

X, $X^1$, $R^3$ and $R^4$ are as described above and p is an integer of from 1 to 6.

2. A photographic element according to claim 1 wherein said polyester comprises the condensation product of:

(A) a bifunctional compound having the formula $$R\begin{matrix}C-X \\ \| \\ O\end{matrix}\bigg/\begin{matrix}\\ \\ \end{matrix}\bigg\backslash\begin{matrix}C-X^1 \\ \| \\ O\end{matrix}$$

wherein R is an alkylene group of from 2 to 10 carbon atoms, X and $X^1$ are independently selected and are —OH, —$OR^1$ where $R^1$ is an alkyl group of from 1 to 18 carbon atoms, or a halogen, or are taken together and constitute an ether oxygen bridge completing a heterocyclic ring;

(B) a thia-alkylene glycol having an alkylene chain of 5 to 24 atoms including 1 or 2 thioether sulfur atoms or an oxathia-alkylene chain of 2 to 24 atoms which contains at least one oxygen atom and at least two sulfur atoms, each oxygen atom and sulfur atom being bivalently linked to adjoining carbon atoms; and (C) a glycol having the formula $$HO-R^2-OH$$

wherein $R^2$ is an arylenedialkylene group, an arylene bis(thia-alkylene) group or an aza-alkylene group of 5–11 atoms including at least one nitrogen atom having a $$\begin{matrix}R^3 \\ | \\ \langle\!\!\!\bigcirc\!\!\!\rangle-CH_2- \\ | \\ R^4\end{matrix}$$

group attached thereto, $R^3$ and $R^4$ being independently selected from the group consisting of hydrogen, lower alkyl of 1–5 carbon atoms and halogen.

3. A photographic element according to claim 2 wherein $R^2$ is $$-(CH_2)_m-\begin{matrix}R^3 \\ | \\ \langle\!\!\!\bigcirc\!\!\!\rangle \\ | \\ R^4\end{matrix}-(CH_2)_m-$$

and m is an integer of from 2 to 5.

4. A photographic element according to claim 3 wherein $R^3$ and $R^4$ are hydrogen.

5. A photographic element according to claim 2 wherein $R^2$ is $$-(CH_2)_n-S-CH_2-\begin{matrix}R^3 \\ | \\ \langle\!\!\!\bigcirc\!\!\!\rangle \\ | \\ R^4\end{matrix}-CH_2-S-(CH_2)_n-$$

and n is an integer of from 1 to 6.

6. A photographic element according to claim 5 wherein $R^3$ and $R^4$ are hydrogen.

7. A photographic element according to claim 2 wherein the molar ratios of bifunctional compound A to thiaalkylene glycol B to glycol C are in the range of 3:2:1 to 4:3:1.

8. A photographic element according to claim 1 wherein said polyester comprises the condensation product of:
(A) a bifunctional compound having the formula

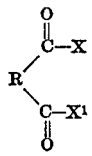

wherein R is a thia-alkylene group of from 3 to 9 atoms including one thioether sulfur atom or a dithiaalkylene group of at least six atoms, including two sulfur atoms, each sulfur atom being linked bivalently to adjoining carbon atoms and X and $X^1$ are independently selected and are —OH, —$OR^1$ where $R^1$ is an alkyl group of from 1 to 18 carbon atoms, or a halogen, or are taken together and constitute an ether oxygen bridge completing a heterocyclic ring;
(B) a thia-alkylene glycol having an alkylene chain of from 5 to 24 atoms including 1 or 2 thio-ether sulfur atoms; and
(C) a glycol having the formula

HO—$R^2$—OH wherein $R^2$ is an arylenedialkylene group, an arylene bis(thia-alkylene) group or an aza-alkylene group of 5–11 atoms including at one nitrogen atom having a

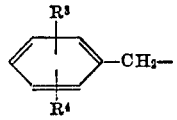

group attached thereto, $R^3$ and $R^4$ being independently selected from the group consisting of hydrogen, lower alkyl of 1–5 carbon atoms, lower alkoxy of 1–5 carbon atoms and halogen.

9. A photographic element according to claim 8 wherein the molar ratios of bifunctional compound A to thia-alkylene glycol B to glycol C are in the range of 3:2:1 to 4:3:1.

10. A photographic element according to claim 1 wherein said polyester comprises the condensation product of:
(A) a bifunctional compound having the formula

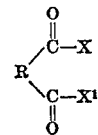

wherein R is an alkylene group of from 2 to 10 carbon atoms and X and $X_1$ are independently selected and are —OH, —$OR^1$ where $R^1$ is an alkyl group, or a halogen, or are taken together and constitute an ether oxygen bridge completing a heterocyclic ring;
(B) a second bifunctional compound having the formula:

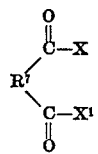

wherein $R^7$ represents the bivalent group

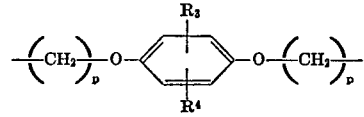

wherein $R^3$ and $R^4$ are independently selected from the group consisting of hydrogen, lower alkyl of 1–5 carbon atoms, lower alkoxy of 1–5 carbon atoms and halogen and $p$ is an integer of from 1 to 6; and
(C) a thia-alkylene glycol having an alkylene chain of 5 to 24 atoms including 1 or 2 thio-ether sulfur atoms or an oxathia-alkylene chain of 2 to 24 atoms which contains at least one oxygen atom and at least two sulfur atoms, each oxygen atom and sulfur atom being bivalently linked to adjoining carbon atoms.

References Cited
UNITED STATES PATENTS

| | | | |
|---|---|---|---|
| 3,046,129 | 6/1962 | Graham et al. | 96—107 X |
| 3,046,132 | 6/1962 | Minsk | 96—114 X |
| 3,046,133 | 6/1962 | Minsk | 96—114 X |
| 3,046,134 | 6/1962 | Dann et al. | 96—114 X |

RONALD H. SMITH, Primary Examiner

U.S. Cl. X.R.

96—69, 95, 96, 99, 100, 107, 108, 114; 260—481 R

UNITED STATES PATENT AND TRADEMARK OFFICE
CERTIFICATE OF CORRECTION

PATENT NO. : 3,813,247
DATED : May 28, 1974
INVENTOR(S) : Louis M. Minsk and Jon T. Staples It is certified that error appears in the above-identified patent and that said Letters Patent are hereby corrected as shown below:

Column 1, line 53, after "carbon" (second occurrence), insert ---atoms---.

Column 3, line 34, "thia-alkylene)" should read ---(thia-alkylene)---.

Column 4, line 27, "an" should read ---and---.

Column 6, line 10, "lower alkoxy of 1 to 5 carbon atoms" (second occurrence), should be deleted.

Column 7, line 24, "polyeters" should read ---polyesters---.

Column 10, line 54, "dithoriourazole" should read ---dithiourazole---.

Column 11, line 8, "Weiss." should read ---Wiss.---; line 33, "xylene" should read ---xylylene---; line 38, "774" should read ---7.74---; and, line 66, "diethia" should read ---dithia---.

Column 13, line 63, "preciptated" should read ---precipitated---

UNITED STATES PATENT AND TRADEMARK OFFICE
CERTIFICATE OF CORRECTION

PATENT NO. : 3,813,247
DATED : May 28, 1974
INVENTOR(S) : Louis M. Minsk and Jon T. Staples It is certified that error appears in the above-identified patent and that said Letters Patent are hereby corrected as shown below:

Column 14, line 55, "bomoiodide" should read ---bromoiodide---; and, line 59, "acetated" should read ---acetate---.

Column 15, line 57, "bomoiodide" should read ---bromoiodide---.

Signed and Sealed this eleventh Day of May 1976

[SEAL]

Attest:

RUTH C. MASON
Attesting Officer

C. MARSHALL DANN
Commissioner of Patents and Trademarks